United States Patent
Lee et al.

(10) Patent No.: US 9,069,529 B2
(45) Date of Patent: Jun. 30, 2015

(54) LIFTING MECHANISM AND ELECTRONIC DEVICE THEREWITH

(71) Applicant: Wistron Corporation, New Taipei (TW)

(72) Inventors: Jia-Hung Lee, New Taipei (TW); San-Pao Kao, New Taipei (TW); Cheng-Hsiang Chuang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 224 days.

(21) Appl. No.: 13/934,246

(22) Filed: Jul. 3, 2013

(65) Prior Publication Data

US 2014/0118901 A1     May 1, 2014

(30) Foreign Application Priority Data

Oct. 25, 2012 (TW) .............................. 101139471 A

(51) Int. Cl.
*G06F 1/16* (2006.01)
(52) U.S. Cl.
CPC ........... *G06F 1/166* (2013.01); *Y10T 74/18304* (2015.01)

(58) Field of Classification Search
CPC ...... G06F 1/166; G06F 1/1667; G06F 1/1675
USPC .................................................... 361/679.59
See application file for complete search history.

(56) References Cited

U.S. PATENT DOCUMENTS 7,200,002 B2     4/2007   Peng

*Primary Examiner* — Anthony Q Edwards
(74) *Attorney, Agent, or Firm* — Winston Hsu; Scott Margo

(57) ABSTRACT

A lifting mechanism includes a lifting member, a first magnetic member, a rotating arm, a second magnetic member and a resilient member. The lifting member is pivoted to a first casing. The first magnetic member is fixed on the lifting member. The rotating arm is pivoted to a second casing. The second magnetic member is fixed on the rotating arm for attracting the first magnetic member as being rotated with the rotating arm to where the second magnetic member is aligned with the first magnetic member, so as to retract the lifting member inside the first casing. The resilient member resiliently abuts against the second casing and the lifting member for pushing the lifting member as being rotated with the rotating arm to where the second magnetic member is not aligned with the first magnetic member, so as to expand the lifting member out of the first casing.

20 Claims, 13 Drawing Sheets

LIFTING MECHANISM AND ELECTRONIC DEVICE THEREWITH

BACKGROUND OF THE INVENTION

1. Field of the Invention

The present invention relates to a lifting mechanism and an electronic device, and more particularly, to a lifting mechanism with retractable function and an electronic device therewith.

2. Description of the Prior Art

Recently, a notebook computer has been widely implemented in human's daily life due to its portability. Conventionally, a rubber foot cushion is utilized for supporting the notebook computer on a holding surface, such as a desk. Since the rubber foot cushion is fixed on the bottom of the notebook computer, it cannot be contained inside a casing of the notebook computer. Furthermore, the size of the rubber foot cushion cannot be enlarged in consideration of structural strength. Accordingly, when the notebook computer utilizes the rubber foot cushion as a supporter, it is not attainable to get a sufficient gap between the notebook computer and the holding surface due to constraint of the size of the rubber foot cushion. As a result, it greatly reduces flexibility of implementation, convenience and comfort of the notebook computer in use.

SUMMARY OF THE INVENTION

The present invention provides a lifting mechanism with retractable function and an electronic device therewith for solving above drawbacks.

According to one embodiment of the present invention, a lifting mechanism with retractable function adapted to an electronic device is disclosed. The electronic device includes a first casing and a second casing combined with the first casing, and the lifting mechanism includes a lifting member, a first magnetic member, a rotating arm, a second magnetic member and at least one resilient member. A side of the lifting member is pivoted to the first casing, and the first magnetic member is fixed on the lifting member. An end of the rotating arm is pivoted to the second casing, and the second magnetic member is fixed on the rotating arm. The second magnetic member attracts the first magnetic member as being rotated with the rotating arm to where the second magnetic member is aligned with the first magnetic member, so as to retract the lifting member inside the first casing. The at least one resilient member resiliently abuts against the second casing and the lifting member, and the at least one resilient member pushes the lifting member as being rotated with the rotating arm to where the second magnetic member is not aligned with the first magnetic member, so as to rotate the lifting member to be expanded out of the first casing. A magnetic force generated by the second magnetic member and the first magnetic member when the second magnetic member is aligned with the first magnetic member is greater than a resilient force generated by the at least one resilient member when the second magnetic member is not aligned with the first magnetic member.

According to another embodiment of the present invention, the lifting mechanism further includes a rotating button rotably installed on the second casing and connected to the end of the rotating arm. The rotating button is for rotating the rotating arm relative to the second casing.

According to another embodiment of the present invention, the rotating button includes a button body and a transmission post. The button body is exposed on the second casing. The transmission post protrudes from the button body and is disposed through the second casing and the end of the rotating arm. The transmission post is for transmitting a torque exerted on the button body from the button body to the rotating arm.

According to another embodiment of the present invention, a through hole is formed on the end of the rotating arm, and the rotating button further includes a hook portion connected to the transmission post. The lifting mechanism further includes a transmission member, and the transmission member includes a transmission bearing portion and an engaging portion. The transmission bearing portion is disposed inside the through hole on the rotating arm and sheathes the transmission post, and the transmission bearing portion is for transmitting the torque from the transmission post to the rotating arm, so as to rotate the rotating arm relative to the second casing. The engaging portion is connected to the transmission bearing portion, and the engaging portion abuts against the rotating arm as being hooked by the hook portion, so as to prevent the end of the rotating arm from separating from the second casing.

According to another embodiment of the present invention, the through hole is a substantially D-shaped through hole, the transmission bearing portion is a substantially D-shaped bearing structure corresponding to the D-shaped through hole, and the transmission post is a substantially D-shaped post corresponding to the D-shaped bearing structure.

According to another embodiment of the present invention, a guiding slot is formed on the other end of the rotating arm, and the lifting mechanism further includes a guiding post disposed on the second casing and installed inside the guiding slot. The guiding post slides along the guiding slot when the rotating button rotates the rotating arm relative to the second casing, so as to guide the rotating arm to rotate relative to the second casing.

According to another embodiment of the present invention, the guiding post includes a hook structure, and the lifting mechanism further includes a bushing member sheathing the guiding post. The bushing member abuts against the rotating arm as being hooked by the hook structure, so as to prevent the other end of the rotating arm from separating from the second casing.

According to another embodiment of the present invention, the rotating arm is a substantially fan-shaped structure.

According to another embodiment of the present invention, the lifting member includes a first fixing structure, and the lifting mechanism further includes a sliding member, a second fixing structure and a guiding structure. The sliding member is slidably disposed on the first casing. The second fixing structure protrudes from a side of the sliding member, and the second fixing structure slides with the sliding member to a fixing position for abutting against the first fixing structure when the lifting member is expanded out of the first casing, so as to keep the lifting member to be out of the first casing. The guiding structure is formed on the second fixing structure, and the guiding structure moves relative to the first fixing structure when the first fixing structure passes through the second fixing structure, so as to guide the sliding member to separate from the fixing position in a second direction opposite to the first direction.

According to another embodiment of the present invention, the lifting mechanism further includes a pushing button and a recovering member. The pushing button is slidably installed on the first casing and connected to the sliding member. The pushing button is for sliding the sliding member relative to the first casing in the first direction or in the second direction. The recovering member is connected to the first casing and the sliding member, and the recovering member is for sliding the sliding member to the fixing position in the first direction.

According to another embodiment of the present invention, the lifting mechanism further includes at least one transmission port disposed on a side of the lifting member. The at least one transmission port are exposed on the first casing when the lifting member is expanded out of the first casing. The at least one transmission port is contained inside the first casing when the lifting member is retracted inside the first casing.

According to another embodiment of the present invention, an electronic device includes a first casing, a second casing and a lifting mechanism. The second casing is combined with the first casing. The lifting mechanism includes a lifting member, a first magnetic member, a rotating arm, a second magnetic member and at least one resilient member. A side of the lifting member is pivoted to the first casing, and the first magnetic member is fixed on the lifting member. An end of the rotating arm is pivoted to the second casing, and the second magnetic member is fixed on the rotating arm. The second magnetic member attracts the first magnetic member as being rotated with the rotating arm to where the second magnetic member is aligned with the first magnetic member, so as to retract the lifting member inside the first casing. The at least one resilient member resiliently abuts against the second casing and the lifting member, and the at least one resilient member pushes the lifting member as being rotated with the rotating arm to where the second magnetic member is not aligned with the first magnetic member, so as to rotate the lifting member to be expanded out of the first casing. A magnetic force generated by the second magnetic member and the first magnetic member when the second magnetic member is aligned with the first magnetic member is greater than a resilient force generated by the at least one resilient member when the second magnetic member is not aligned with the first magnetic member.

In summary, the present invention utilizes the first magnetic member, the second magnetic member and the resilient member to retract the lifting member inside the first casing or expanding the lifting member to be out of the first casing. When the second magnetic member is rotated with the rotating arm to the position where the second magnetic member is aligned with the first magnetic member, the magnetic force generated between the first magnetic member and the second magnetic member is used for retracting the lifting member inside the first casing, so that the electronic device is facilitated to carry or contain. In addition, when the second magnetic member is rotated with the rotating arm to the position where the second magnetic member is not aligned with the first magnetic member, the resilient member resiliently pushes the lifting member, so as to drive the lifting member to be expanded out of the first casing. As a result, it can further lift the first casing and the second casing of the electronic device.

Furthermore, when the electronic device utilizes the lifting member as a supporter, the lifting member can be thickened practically, so as to increase a gap between the electronic device and a holding surface. Accordingly, it provides the user with a comfortable angle when the electronic device is in use. As a result, it greatly increases flexibility of implementation, convenience and comfort of the electronic device in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
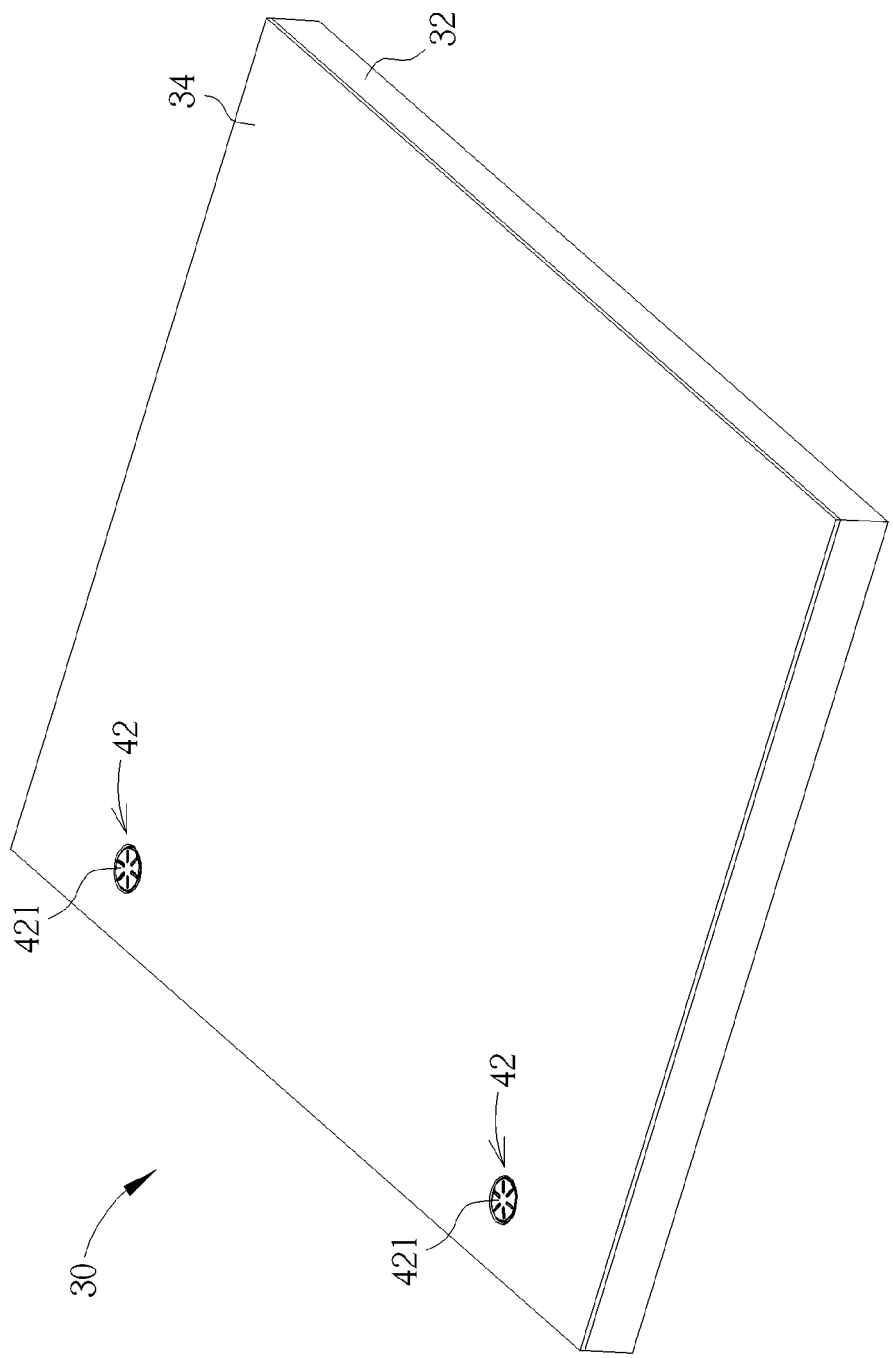
FIG. 1 is a schematic diagram of an electronic device according to an embodiment of the present invention.
Figure 2:
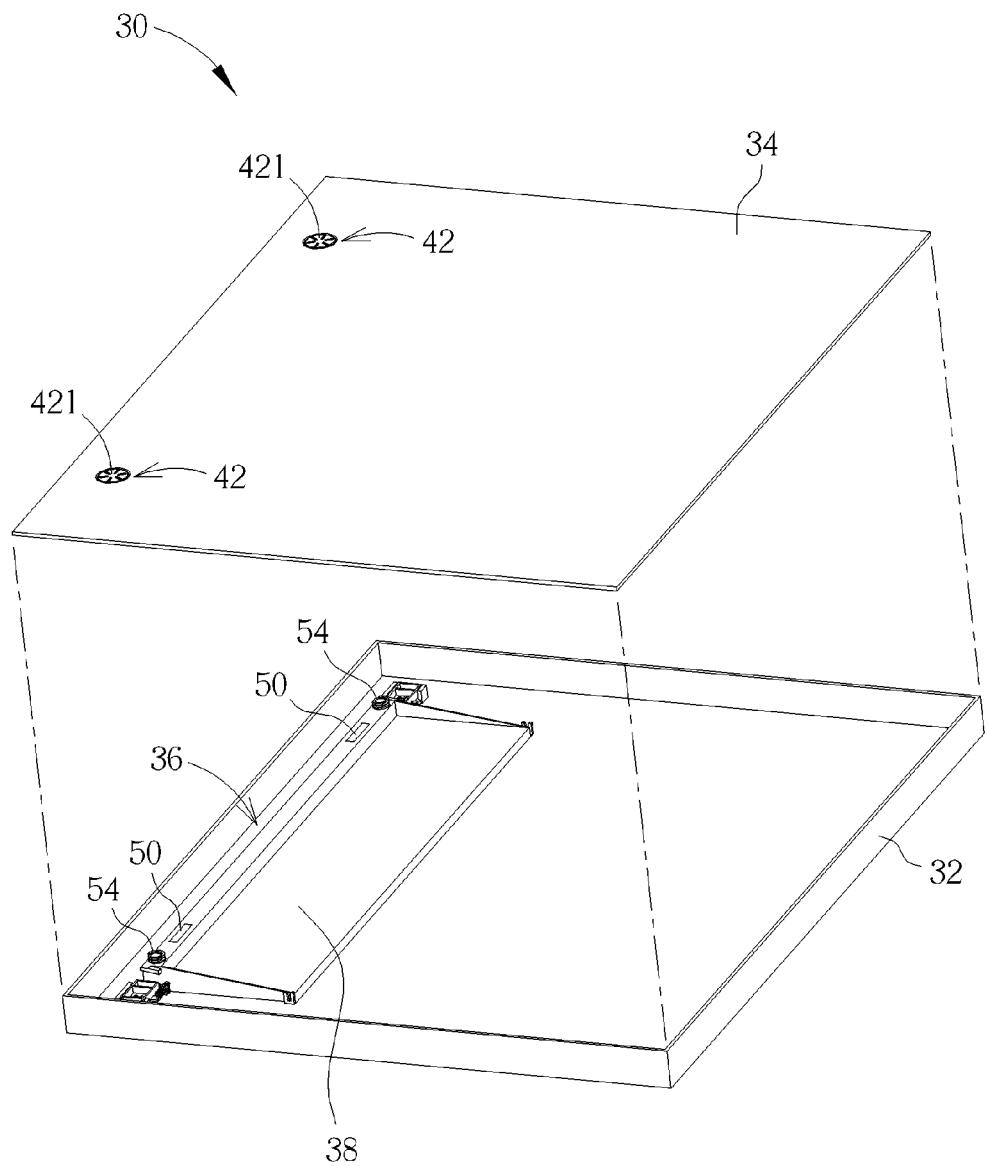
FIG. 2 is an exploded diagram of the electronic device according to an embodiment of the present invention.

Please refer to FIG. 1 and FIG. 2. FIG. 1 is a schematic diagram of an electronic device 30 according to an embodiment of the present invention. FIG. 2 is an exploded diagram of the electronic device 30 according to an embodiment of the present invention. As shown in FIG. 1 and FIG. 2, the electronic device 30 includes a first casing 32 and a second casing 34 combined with the first casing 32. The first casing 32 and the second casing 34 cooperatively cover internal components of the electronic device 30, so as to prevent the internal components of the electronic device 30 from damage due to collision. In this embodiment, the electronic device 30 is, but not limited to, a host module of a notebook computer. For example, the electronic device 30 can be a keyboard module as well. As for which one of the aforesaid designs is adopted, it depends on practical demands.

In addition, the electronic device 30 further includes a lifting mechanism 36 installed inside the first casing 32 and the second casing 34. Furthermore, the lifting mechanism 36 includes a lifting member 38 with a side pivoted to the first casing 32. Accordingly, the lifting member 38 can pivot relative to the first casing 32 to be retracted inside the first casing 32, or the lifting member 38 can pivot relative to the first casing 32 to be expanded on the first casing 32. In other words, the lifting mechanism 36 of the present invention has retractable function, i.e. the lifting mechanism 36 can be expanded out of the first casing 32 when the electronic device 30 is in use, so as to lift the first casing 32 and the second casing 34 for providing a user with a comfortable orientation, or the lifting mechanism 36 can be retracted inside the first casing 32 when the electronic device 30 is not in use for facilitating containing or carrying.

As shown in FIG. 1 and FIG. 2, structures and components disposed on two sides of the lifting mechanism 36 are symmetric to each other, i.e. the components disposed on one side of the lifting mechanism 36 are identical to the components disposed on the other side of the lifting mechanism 36. The structures and principles of the components disposed on one side of the lifting mechanism 36 are illustrated hereinafter and the structures, and since principles of the components disposed on the other side of the lifting mechanism 36 are identical, the relative descriptions are omitted for simplicity.

Figure 3:
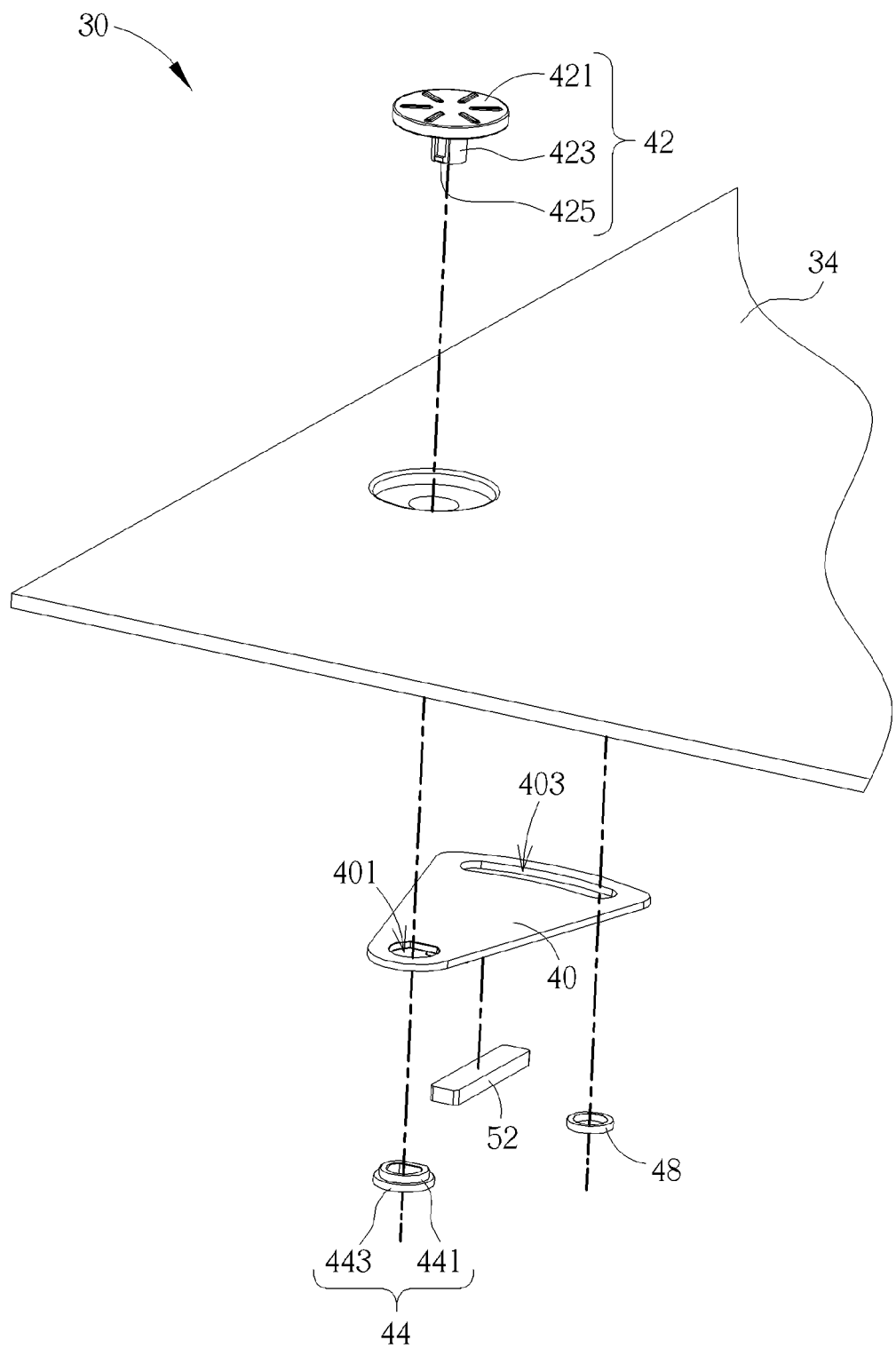
FIG. 3 is an exploded diagram of a second casing and a lifting mechanism according to the embodiment of the present invention.
Figure 4:
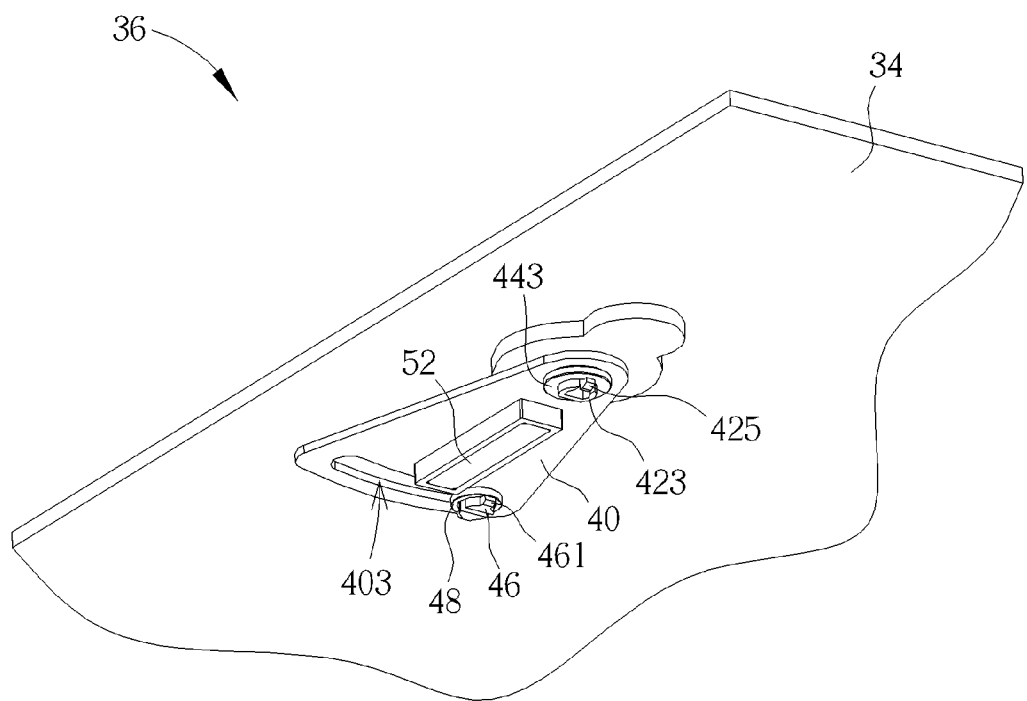
FIG. 4 is a diagram of the second casing and the lifting mechanism in another view according to the embodiment of the present invention.
Figure 5:
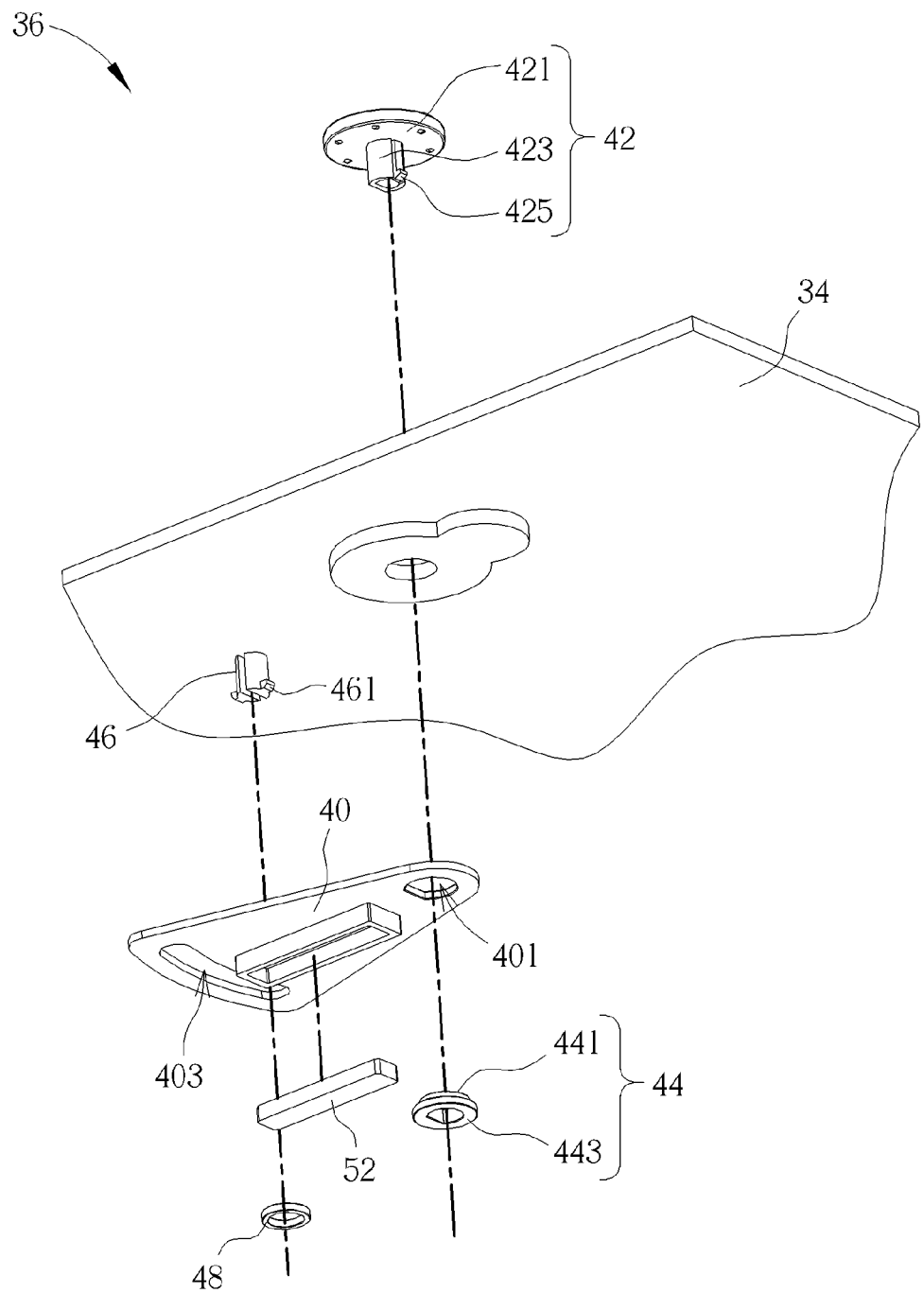
FIG. 5 is an exploded diagram of the second casing and the lifting mechanism in another view according to the embodiment of the present invention.
Figure 6:
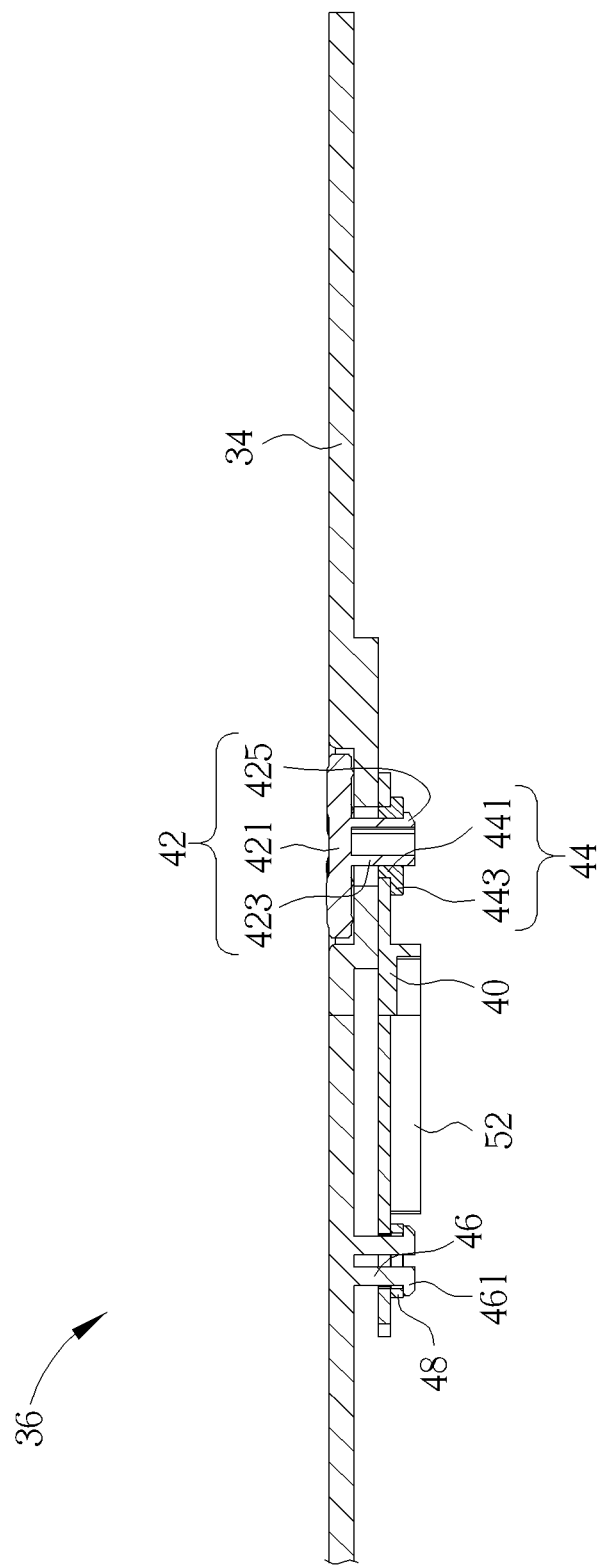
FIG. 6 is a partly sectional diagram of the second casing and the lifting mechanism according to the embodiment of the present invention.

Please refer to FIG. 3 to FIG. 6. FIG. 3 is an exploded diagram of the second casing 34 and the lifting mechanism 36 according to the embodiment of the present invention. FIG. 4 is a diagram of the second casing 34 and the lifting mechanism 36 in another view according to the embodiment of the present invention. FIG. 5 is an exploded diagram of the second casing 34 and the lifting mechanism 36 in another view according to the embodiment of the present invention. FIG. 6 is a partly sectional diagram of the second casing 34 and the lifting mechanism 36 according to the embodiment of the present invention. As shown in FIG. 3 to FIG. 6, the lifting mechanism 36 further includes a rotating arm 40 and a rotating button 42. An end of the rotating arm 40 is pivoted to the second casing 34, and the rotating button 42 is rotably installed on the second casing 34 and connected to the end of the rotating arm 40.

Furthermore, the rotating button 42 includes a button body 421 exposed on the second casing 34, as shown in FIG. 1 and FIG. 2. The button body 421 provides a place for the user to apply a torque on the rotating button 42. In addition, the rotating button 42 further includes a transmission post 423 protruding from the button body 421 and being disposed through the second casing 34 and the end of the rotating arm 40. The transmission post 423 is used for transmitting the torque exerted on the button body 421 from the button body 421 to the rotating arm 40. Furthermore, a through hole 401 is formed on the end of the rotating arm 40, and the lifting mechanism 36 further includes a transmission member 44. The transmission member 44 includes a transmission bearing portion 441 disposed inside the through hole 401 on the end of the rotating arm 40 and sheathing the transmission post 423 of the rotating button 42.

In this embodiment, the through hole 401 on the end of the rotating arm 40 is a substantially D-shaped through hole, and the transmission bearing portion 441 of the transmission member 44 is a substantially D-shaped bearing structure corresponding to the D-shaped through hole. When the transmission bearing portion 441 (i.e. the D-shaped bearing structure) of the transmission member 44 is disposed inside the through hole 401 (i.e. the D-shaped through hole) on the end of the rotating arm 40, the transmission bearing portion 441 (i.e. the D-shaped bearing structure) matches the through hole 401 (i.e. the D-shaped through hole), so that the torque is transmitted between the transmission bearing portion 441 (i.e. the D-shaped bearing structure) and the through hole 401 (i.e. the D-shaped through hole).

In this embodiment, the transmission post 423 of the rotating button 42 is a substantially D-shaped post corresponding to the D-shaped bearing structure (i.e. the transmission bearing portion 441). When the transmission bearing portion 441 (i.e. the D-shaped bearing structure) of the transmission member 44 sheathes the transmission post 423 (i.e. the D-shaped post) of the rotating button 42, an inner bore of the transmission bearing portion 441 (i.e. the D-shaped bearing structure) matches the transmission post 423 (i.e. the D-shaped post), so that the torque is transmitted between the transmission bearing portion 441 (i.e. the D-shaped bearing structure) and the transmission post 423 (i.e. the D-shaped post).

In such a manner, when the torque is exerted on the button body 421 of the rotating button 42, the transmission post 423 of the rotating button 42 is capable of transmitting the torque from the button body 421 to the transmission bearing portion 441 of the transmission member 44. Afterwards, the transmission bearing portion 441 of the transmission member 44 transmits the torque from the transmission post 423 of the rotating button 42 to the rotating arm 40 by the above-mentioned D-shaped structures. Accordingly, the rotating button 42 is capable of driving the rotating arm 40 to rotate relative to the second casing 34.

Structures of the through hole 401 on the end of the rotating arm 40, the transmission bearing portion 441 of the transmission member 44 and the transmission post 423 of the rotating button 42 are not limited to those mentioned in this embodiment. For example, the through hole 401 on the end of the rotating arm 40 can be a substantially rectangular through hole as well, the transmission bearing portion 441 of the transmission member 44 can be a substantially rectangular bearing structure corresponding to the rectangular through hole as well, and the transmission post 423 of the rotating button 42 can be a substantially rectangular post corresponding to the rectangular bearing structure (i.e. the transmission bearing portion 441) as well. In other words, structures of the through hole 401, the transmission bearing portion 441 and the transmission post 423 with non-circular cross sections are within the scope of the present invention.

As shown in FIG. 3 to FIG. 6, the rotating button 42 further includes a hook portion 425 connected to the transmission post 423, and the transmission member 44 further includes an engaging portion 443 connected to the transmission bearing portion 441. When the end of the rotating arm 40 and the rotating button 42 are assembled, the transmission bearing portion 441 of the transmission member 44 is disposed through the through hole 401 on the end of the rotating arm 40 first, and then the transmission post 423 of the rotating button 42 is disposed through the second casing 34 and the transmission member 44 until the rotating button 42 is located in a position shown in FIG. 4 and FIG. 6. Meanwhile, the engaging portion 443 of the transmission member 44 is hooked by the hook portion 425 of the rotating button 42, and the hook portion 425 of the rotating button 42 presses the engaging portion 443 of the transmission member 44, so that the engaging portion 443 rotates and abuts against the rotating arm 40 for fixing the end of the rotating arm 40 onto the second casing 34. In other words, the hook portion 425 of the rotating button 42 and the engaging portion 443 of the transmission member 44 can prevent the end of the rotating arm 40 from separating from the second casing 34, so as to fix the end of the rotating arm 40 onto the second casing 34.

In addition, a guiding slot 403 is formed on the other end of the rotating arm 40, and the lifting mechanism 36 further includes a guiding post 46 disposed on the second casing 34 and installed inside the guiding slot 403 on the other end of the rotating arm 40. When the rotating button 42 drives the rotating arm 40 to rotate relative to the second casing 34, the guiding post 46 on the second casing 34 slides along the guiding slot 403 on the other end of the rotating arm 40, so as to guide the rotating arm 40 to rotate relative to the second casing 34 stably. In other words, the guiding slot 403 on the other end of the rotating arm 40 is used for providing a rotating path, so that the rotating arm 40 rotates relative to the second casing 34 stably. Accordingly, the other end of the rotating arm 40 needs to have a specific width for forming the guiding slot 403.

As mentioned above, the rotating arm 40 in this embodiment is a substantially fan-shaped structure, and the width of the other end of the fan-shaped structure (i.e. the rotating arm 40) is greater than the width of the end of the fan-shaped structure (i.e. the rotating arm 40). Structures of the rotating arm 40 are not limited to those mentioned in this embodiment. For example, the rotating arm 40 can be a substantially T-shaped structure as well. In other words, structures of the rotating arm 40 with the width of the other end being greater than the end of the end are within the scope of the present invention.

As shown in FIG. 3 to FIG. 6, the guiding post 46 of the lifting mechanism 36 includes a hook structure 461, and the lifting mechanism 36 further includes a bushing member 48 sheathing the guiding post 46. When the other end of the rotating arm 40 and the bushing member 48 are assembled, the guiding slot 403 on the other end of the rotating arm 40 and the bushing member 48 sheathe the guiding post 46 of the lifting mechanism 36 until the rotating arm 40 is located in the position shown in FIG. 4 and FIG. 6. Meanwhile, the bushing member 48 can be hooked by the hook structure 461 of the guiding post 46 and further abut against the other end of the rotating arm 40. In such a manner, the hook structure 461 of the guiding post 46 and the bushing member 48 can cooperatively present the other end of the rotating arm 40 from separating from the second casing 34.

It should be noticed that the bushing member 48 of the present invention can be omitted. In other words, when the other end of the rotating arm 40 is assembled, the lifting mechanism 36 can utilize the hook structure 461 of the guiding post 46 to hook the other end of the rotating arm 40 for preventing the other end of the rotating arm 40 from separating from the second casing 34. In such a manner, the bushing member 48 of the lifting mechanism 36 can be omitted for saving material costs of the electronic device 30. As for which one of the above-mentioned designs is adopted, it depends on practical demands.

As shown in FIG. 2 to FIG. 6, the lifting mechanism 36 further includes a first magnetic member 50 and a second magnetic member 52. The first magnetic member 50 is fixed on the lifting member 38, and the second magnetic member 52 is fixed on the rotating arm 40. The second magnetic member 52 and the first magnetic member 50 attract each other, so as to drive the lifting member 38 to rotate for being retracted inside the first casing 32. In this embodiment, the first magnetic member 50 and the second magnetic member 52 are, but not limited to, a magnet respectively. For example, one of the first magnetic member 50 and the second magnetic member 52 can be a magnet, while the other one of the first magnetic member 50 and the second magnetic member 52 can be made of metal material. As for which one of the above-mentioned designs is adopted, it depends on practical demands.

Figure 7:
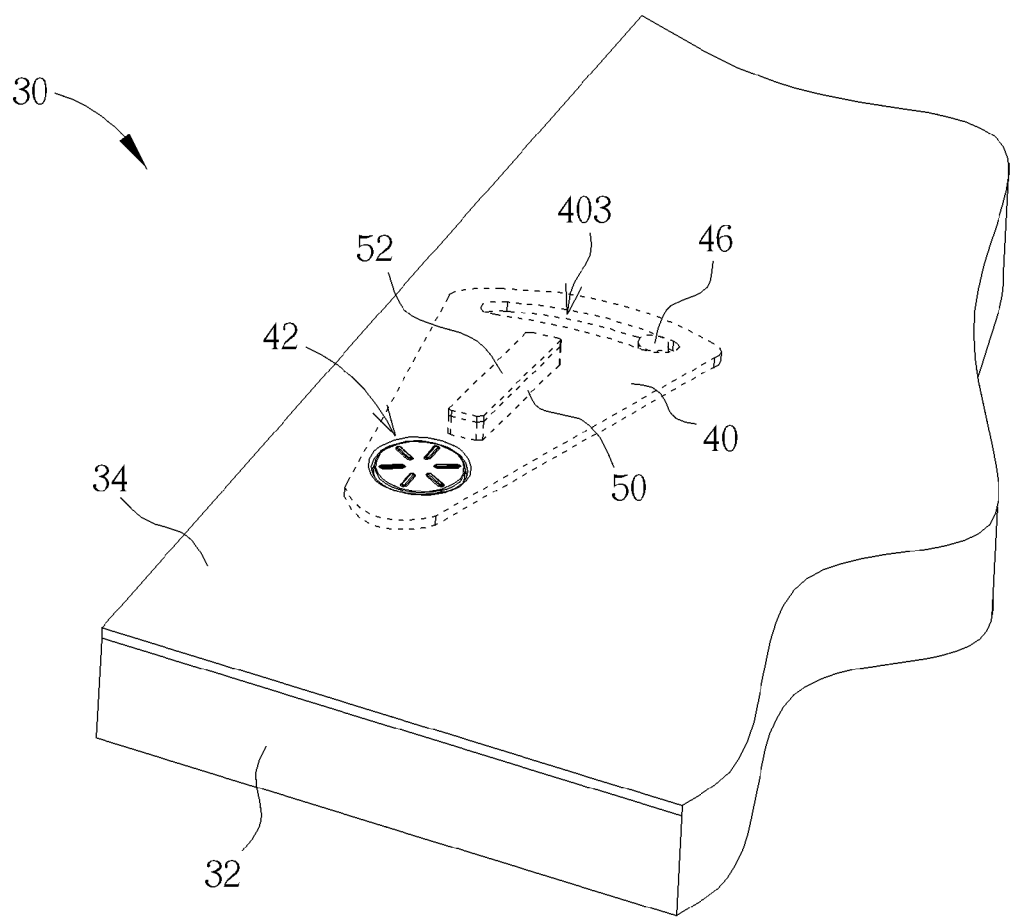
FIG. 7 is a diagram illustrating that a second magnetic member is aligned with a first magnetic member according to the embodiment of the present invention.
Figure 8:
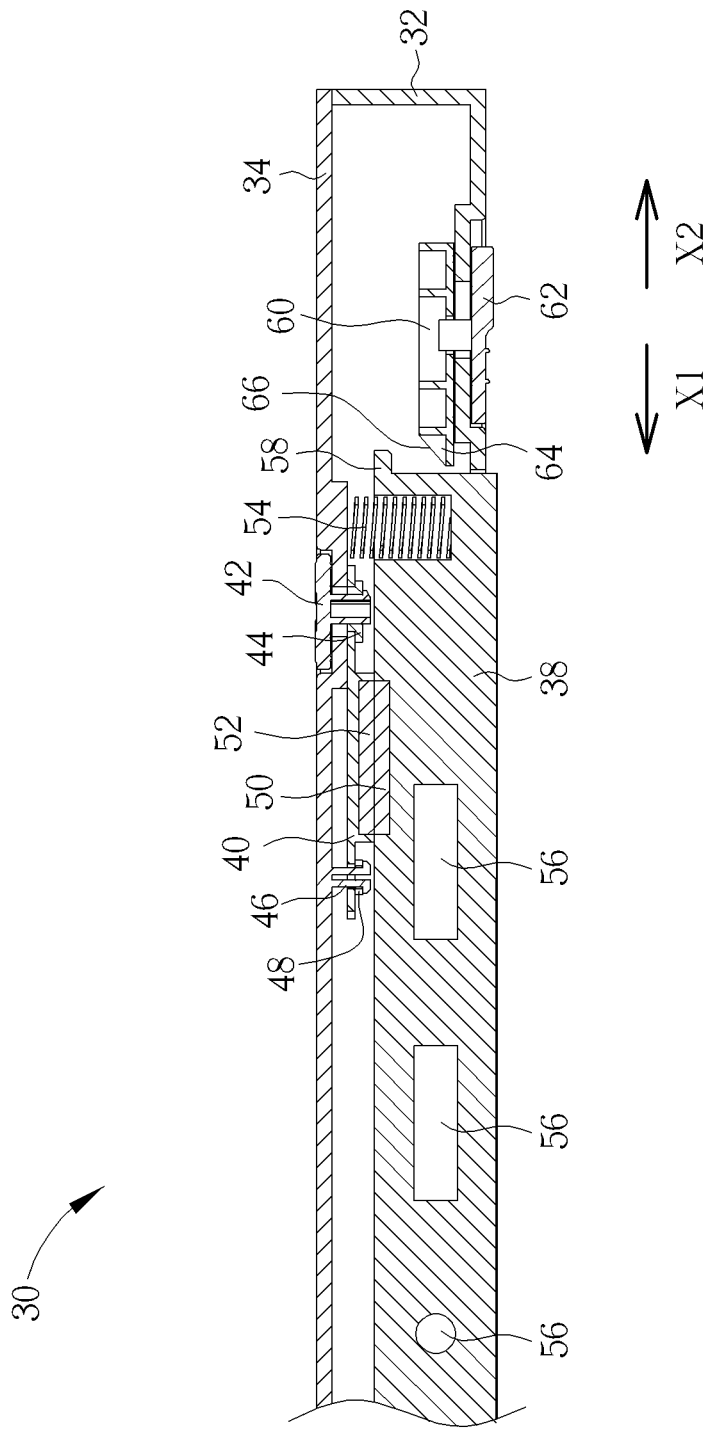
FIG. 8 is a sectional diagram illustrating that the second magnetic member is aligned with the first magnetic member according to the embodiment of the present invention.
Figure 9:
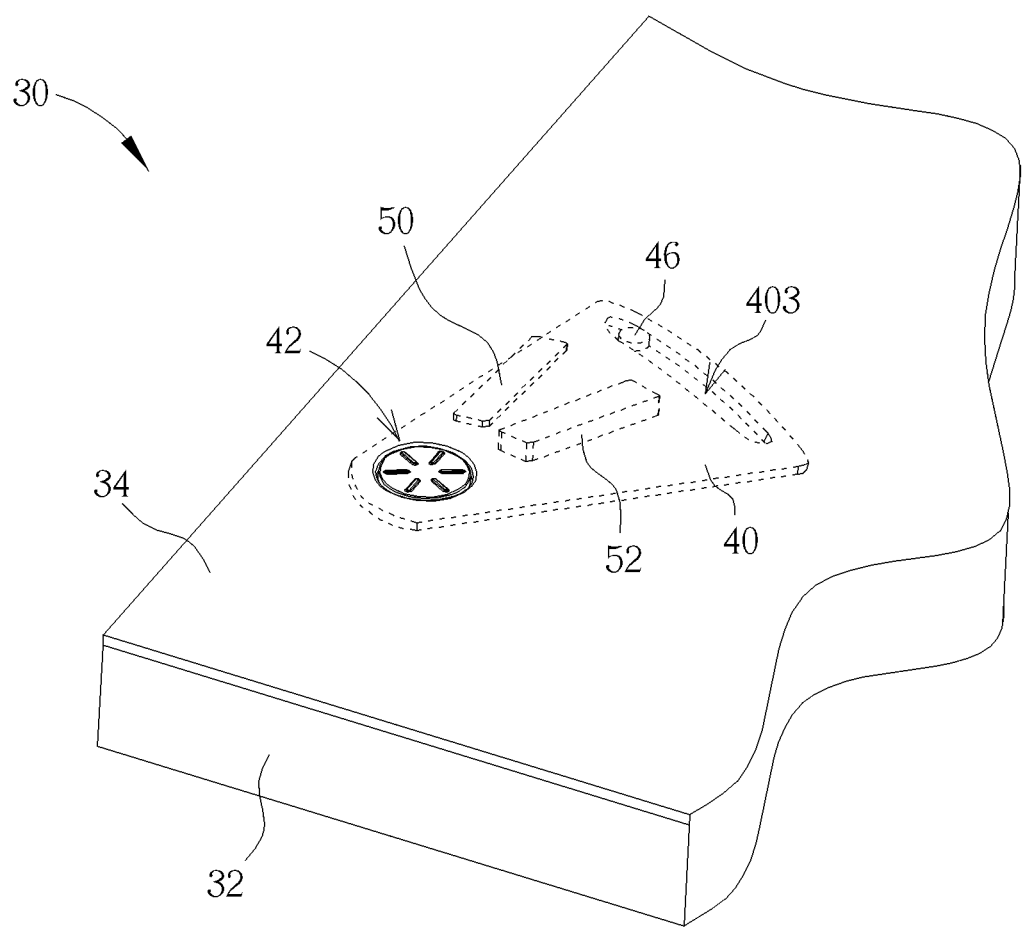
FIG. 9 is a diagram illustrating that the second magnetic member is not aligned with the first magnetic member according to the embodiment of the present invention.
Figure 10:
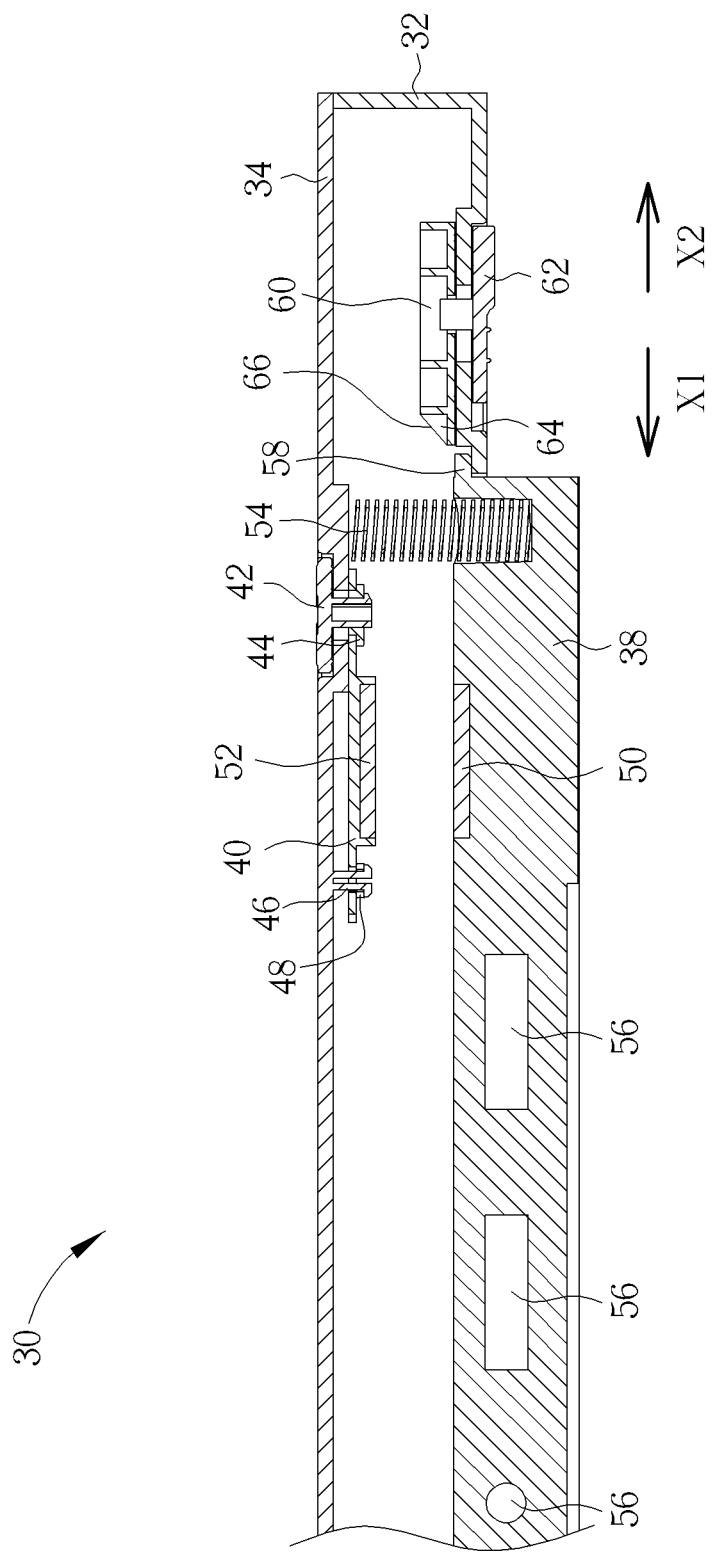
FIG. 10 is a sectional diagram illustrating that the second magnetic member is not aligned with the first magnetic member according to the embodiment of the present invention.

Please refer to FIG. 7 to FIG. 10. FIG. 7 is a diagram illustrating that the second magnetic member 52 is aligned with the first magnetic member 50 according to the embodiment of the present invention. FIG. 8 is a sectional diagram illustrating that the second magnetic member 52 is aligned with the first magnetic member 50 according to the embodiment of the present invention. FIG. 9 is a diagram illustrating that the second magnetic member 52 is not aligned with the first magnetic member 50 according to the embodiment of the present invention. FIG. 10 is a sectional diagram illustrating that the second magnetic member 52 is not aligned with the first magnetic member 50 according to the embodiment of the present invention. As shown in FIG. 7 to FIG. 10, the lifting mechanism 36 further includes at least one resilient member 54. In this embodiment, the lifting mechanism 36 includes two resilient members 54 disposed on two sides of the lifting member 38, as shown in FIG. 2. An amount and disposal positions of the resilient member 54 are not limited to those illustrated in figures, and it depends on practical demands.

When the rotating button 42 of the lifting mechanism 36 is rotated to a position shown in FIG. 7 and FIG. 8, the rotating arm 40 is driven by the rotating button 42 to rotate to the position shown in FIG. 7 and FIG. 8. Meanwhile, the second magnetic member 52 fixed on the rotating arm 40 is rotated with the rotating arm 40 to the position shown in FIG. 7 and FIG. 8, i.e. the second magnetic member 52 is rotated with the rotating arm 40 to a position where the second magnetic member 52 is aligned with the first magnetic member 50. As a result, the second magnetic member 52 is capable of attracting the first magnetic member 50, so as to drive the lifting member 38 to rotate relative to the first casing 32 for being retracted inside the first casing 32, as shown in FIG. 8.

As mentioned above, during the lifting member 38 is rotated relative to the first casing 32 for being retracted inside the first casing 32, the lifting member 38 compresses the resilient members 54 to make the resilient members 54 store a resilient potential energy. When the rotating button 42 of the lifting mechanism 36 is rotated to a position shown in FIG. 9 and FIG. 10, the rotating arm 40 is driven by the rotating button 42 to rotate to the position shown in FIG. 9 and FIG. 10. Meanwhile, the second magnetic member 52 fixed on the rotating arm 40 is rotated with the rotating arm 40 to the position shown in FIG. 9 and FIG. 10, i.e. the second magnetic member 52 is rotated with the rotating arm 40 to a position where the second magnetic member 52 is not aligned with the first magnetic member 50. As a result, an attracting force between the second magnetic member 52 and the first magnetic member 50 disappears, and the resilient members 54 release the resilient potential energy to generate a resilient force for driving the lifting member 38. In such a manner, the lifting member 38 is capable of rotating relative to the first casing 32 for being expanded out of the first casing 32, as shown in FIG. 10.

In order to smoothly retract the lifting member 38 from the position shown in FIG. 10 to the position shown in FIG. 8, a magnetic force generated by the first magnetic member 50 and the second magnetic member 52 when the second magnetic member 52 is aligned with the first magnetic member 50 is practically designed to be greater than a resilient force generated by the resilient members 54 when the first magnetic member 50 is not aligned with the second magnetic member 52. In such a manner, when the second magnetic member 52 is rotated with the rotating arm 40 to the position where the second magnetic member 52 is aligned with the first magnetic member 50, as shown in FIG. 7 and FIG. 8, the magnetic force generated between the first magnetic member 50 and the second magnetic member 52 not only overcomes rigidity of the resilient member 54 for compressing the resilient member 54, but also drives the lifting member 38 to further rotate relative to the first casing 32 for being retracted inside the first casing 32.

In addition, the lifting mechanism 36 can further include at least one transmission port 56 disposed on a side of the lifting member 38. In this embodiment, the lifting mechanism 36 includes three transmission ports 56. An amount and disposal positions of the transmission port 56 are not limited to those mentioned in this embodiment, and it depends on practical demands. When the lifting member 38 is rotated relative to the first casing 32 for being expanded out of the first casing 32, the transmission ports 56 are exposed on the first casing 32, as shown in FIG. 10. In such a manner, the electronic device 30 can be coupled to an external electronic device by the transmission ports 56, i.e. the lifting mechanism 36 can be a lifting mechanism with expanding function for enhancing flexibility of the electronic device 30.

On the other hand, when the lifting member 38 is rotated relative to the first casing 32 for being retracted inside the first casing 32, the transmission ports 56 are contained inside the first casing 32, as shown in FIG. 7 and FIG. 8, so as to protect the transmission ports 56 from damages due to collision. It should be noticed that the transmission ports 56 of the present invention can be omitted, i.e. the lifting mechanism 36 of the present invention can be a lifting mechanism without expanding function. Thus, it can omit the transmission port 56 for saving costs of the lifting mechanism 36 in manufacture.

Figure 11:
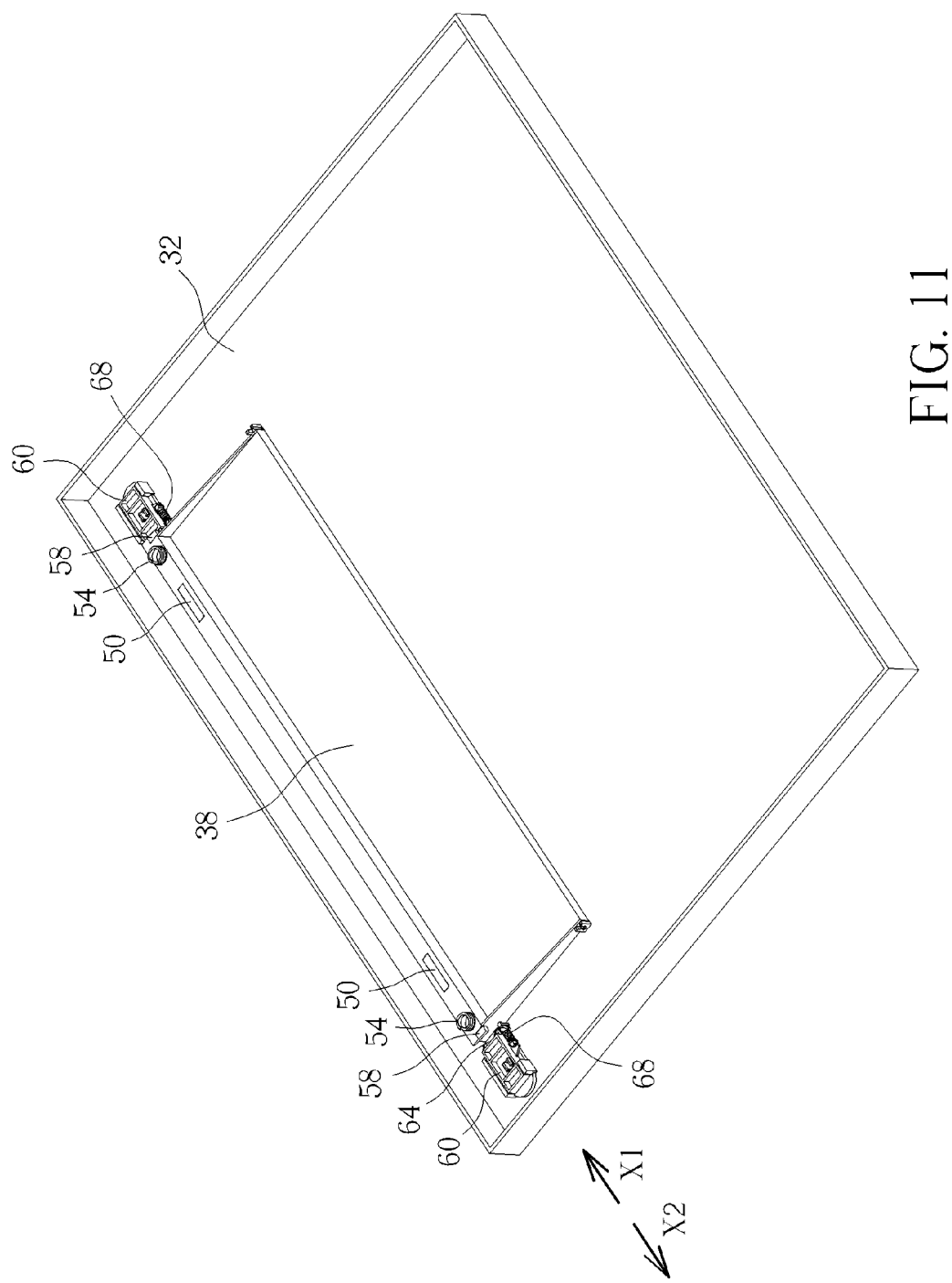
FIG. 11 is a diagram of a first casing and the lifting mechanism according to the embodiment of the present invention.
Figure 12:
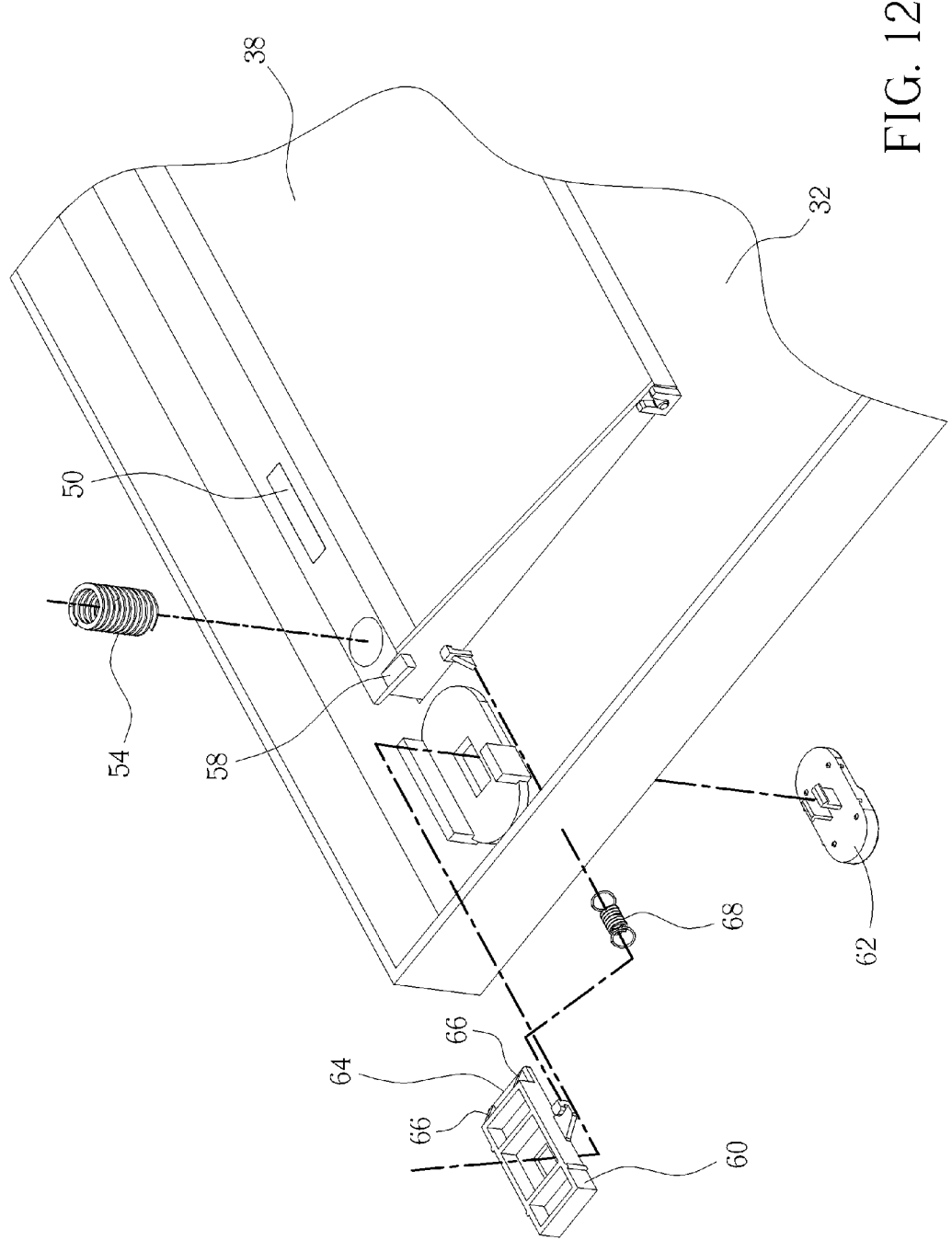
FIG. 12 is an exploded diagram of the first casing and the lifting mechanism according to the embodiment of the present invention.
Figure 13:
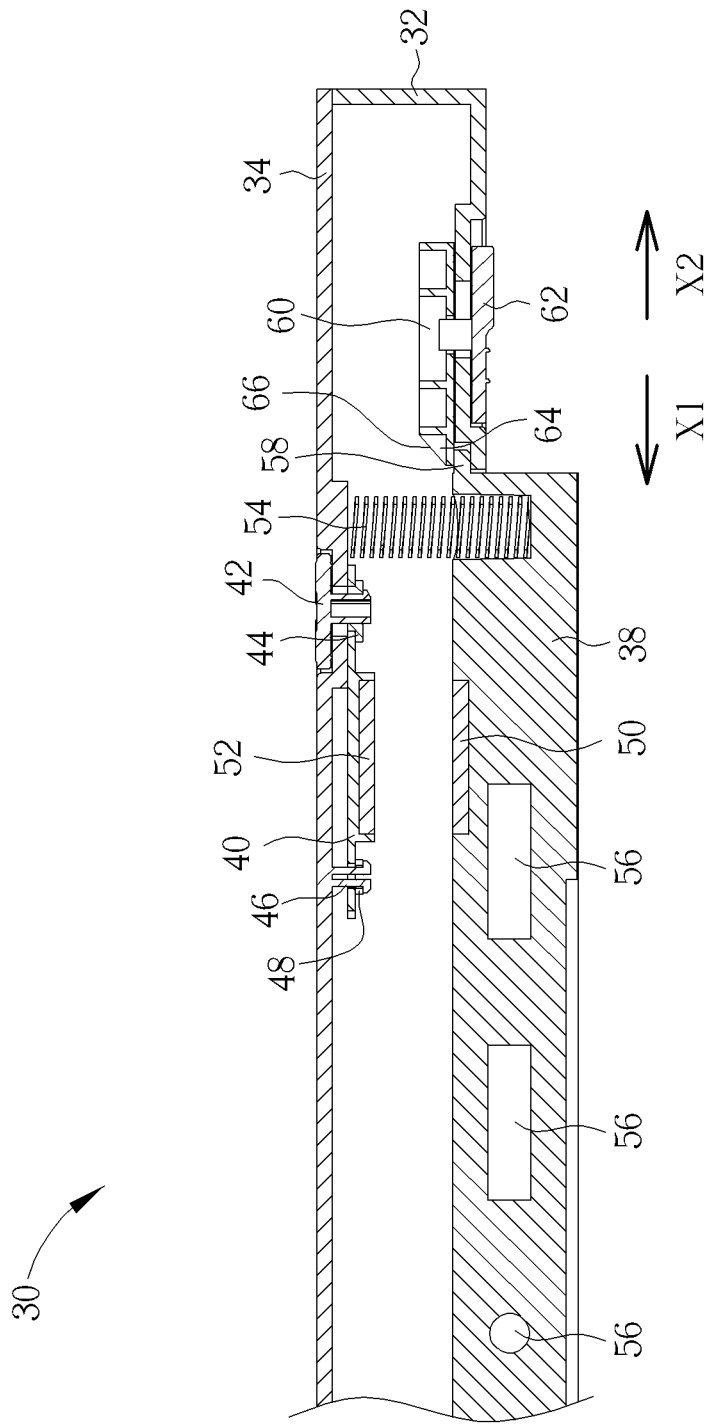
FIG. 13 is a sectional diagram of the first casing and the lifting mechanism in an fixing status according to the embodiment of the present invention.

Please refer to FIG. 8 and FIG. 10 to FIG. 13. FIG. 11 is a diagram of the first casing 32 and the lifting mechanism 36 according to the embodiment of the present invention. FIG. 12 is an exploded diagram of the first casing 32 and the lifting mechanism 36 according to the embodiment of the present invention. FIG. 13 is a sectional diagram of the first casing 32 and the lifting mechanism 36 in an fixing status according to the embodiment of the present invention. As shown in FIG. 8 and FIG. 10 to FIG. 13, the lifting member 38 of the lifting mechanism 36 includes a first fixing structure 58, and the lifting mechanism 36 further includes a sliding member 60 and a pushing button 62. The sliding member 60 is slidably disposed on the first casing 32, and the pushing button 62 is slidably installed on the first casing 32 and connected to the sliding member 60. Furthermore, the pushing button 62 is exposed on the first casing 32, as shown in FIG. 8, FIG. 10 and FIG. 13, so that the pushing button 62 is driven by the user to slide the sliding member 60 relative to the first casing 32. In addition, the lifting mechanism 36 further includes a second fixing structure 64 protruding from a side of the sliding member 60 corresponding to the first fixing structure 58.

When the rotating button 42 is rotated to drive the second magnetic member 52 fixed on the rotating arm 40 to rotate to the position where the second magnetic member 52 is not aligned with the first magnetic member 50, the resilient member 54 drives the lifting member 38 to rotate relative to the first casing 32 for being expanded out of the first casing 32, as shown in FIG. 10 and FIG. 13. Afterwards, the pushing button 62 is pushed to slide the sliding member 60 from a released position shown in FIG. 10 to an fixing position shown in FIG. 13 in a first direction X1. Meanwhile, the second fixing structure 64 is slid with the sliding member 60 from the released position to the fixing position in the first direction X1 for abutting against the first fixing structure 58 of the lifting member 38. Accordingly, the second fixing structure 64 protruding from the side of the sliding member 60 is capable of fixing the sliding member 60 to be expanded out of the first casing 32.

Furthermore, the lifting mechanism 36 further includes a guiding structure 66 formed on the second fixing structure 64 protruding from the side of the sliding member 60. During the resilient member 54 drives the lifting member 38 to rotate relative to the first casing 32 for being expanded out of the first casing 32, the first fixing structure 58 of the guiding structure 66 passes through the second fixing structure 64. Meanwhile, the guiding structure 66 moves relative to the first fixing structure 58, so as to guide the sliding member 60 to separate from the fixing position in a second direction X2. In such a manner, the first fixing structure 58 can pass through the second fixing structure 64 smoothly, so that the lifting member 38 is expanded out of the first casing 32.

In addition, the lifting mechanism 36 can further include a recovering member 68 connected to the first casing 32 and the sliding member 60. When the pushing button 62 is driven to slide the sliding member 60 from the fixing position shown in FIG. 13 to the released position shown in FIG. 10 in the second direction X2, the recovering member 68 is stretched and thus stores a resilient potential energy. When the pushing button 62 is released, the recovering member 68 releases the resilient potential energy for generating a resilient force, so as to drive the sliding member 60 to slide to the fixing position in the first direction X1. In this embodiment, the recovering member 68 is a spring.

In other words, the recovering member 68 can recover the sliding member 60 to the fixing position by the resilient force and thus it does not require an external force, such as being pushed in a manual manner. In other words, the recovering member 68 is an automatic recovery mechanism implemented in the sliding member 60. In the present invention, the recovering member 68 can be omitted. In other words, when the lifting mechanism 36 of the present invention does not require the aforesaid automatic recovery function, the lifting mechanism 36 can omit the recovering member 68 for saving costs of the lifting mechanism 36.

Compared to the prior art, the present invention utilizes the first magnetic member, the second magnetic member and the resilient member to retract the lifting member inside the first casing or expanding the lifting member to be out of the first casing. When the second magnetic member is rotated with the rotating arm to the position where the second magnetic member is aligned with the first magnetic member, the magnetic force generated between the first magnetic member and the second magnetic member is used for retracting the lifting member inside the first casing, so that the electronic device is facilitated to carry or contain. In addition, when the second magnetic member is rotated with the rotating arm to the position where the second magnetic member is not aligned with the first magnetic member, the resilient member resiliently pushes the lifting member, so as to drive the lifting member to be expanded out of the first casing. As a result, it can further lift the first casing and the second casing of the electronic device.

Furthermore, when the electronic device utilizes the lifting member as a supporter, the lifting member can be thickened practically, so as to increase a gap between the electronic device and a holding surface. Accordingly, it provides the user with a comfortable angle when the electronic device is in use. As a result, it greatly increases flexibility of implementation, convenience and comfort of the electronic device in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lifting mechanism with retractable function adapted to an electronic device, the electronic device comprising a first casing and a second casing combined with the first casing, the lifting mechanism comprising:
   a lifting member with a side pivoted to the first casing;
   a first magnetic member fixed on the lifting member;
   a rotating arm with an end pivoted to the second casing;
   a second magnetic member fixed on the rotating arm, the second magnetic member attracting the first magnetic member as being rotated with the rotating arm to where the second magnetic member is aligned with the first magnetic member, so as to retract the lifting member inside the first casing; and
   at least one resilient member resiliently abutting against the second casing and the lifting member, the at least one resilient member pushing the lifting member as being rotated with the rotating arm to where the second magnetic member is not aligned with the first magnetic member, so as to rotate the lifting member to be expanded out of the first casing, wherein a magnetic force generated by the second magnetic member and the first magnetic member when the second magnetic member is aligned with the first magnetic member is greater than a resilient force generated by the at least one resilient member when the second magnetic member is not aligned with the first magnetic member.

2. The lifting mechanism of claim 1, further comprising:
   a rotating button rotably installed on the second casing and connected to the end of the rotating arm, the rotating button being for rotating the rotating arm relative to the second casing.

3. The lifting mechanism of claim 2, wherein the rotating button comprises:
   a button body exposed on the second casing; and
   a transmission post protruding from the button body and being disposed through the second casing and the end of the rotating arm, the transmission post being for transmitting a torque exerted on the button body from the button body to the rotating arm.

4. The lifting mechanism of claim 3, wherein a through hole is formed on the end of the rotating arm, the rotating button further comprises a hook portion connected to the transmission post, the lifting mechanism further comprises a transmission member, and the transmission member comprises:
   a transmission bearing portion disposed inside the through hole on the rotating arm and sheathing the transmission post, the transmission bearing portion being for transmitting the torque from the transmission post to the rotating arm, so as to rotate the rotating arm relative to the second casing; and
   an engaging portion connected to the transmission bearing portion, the engaging portion abutting against the rotating arm as being hooked by the hook portion, so as to prevent the end of the rotating arm from separating from the second casing.

5. The lifting mechanism of claim 4, wherein the through hole is a substantially D-shaped through hole, the transmission bearing portion is a substantially D-shaped bearing structure corresponding to the D-shaped through hole, and the transmission post is a substantially D-shaped post corresponding to the D-shaped bearing structure.

6. The lifting mechanism of claim 2, wherein a guiding slot is formed on the other end of the rotating arm, and the lifting mechanism further comprises:
   a guiding post disposed on the second casing and installed inside the guiding slot, the guiding post sliding along the guiding slot when the rotating button rotates the rotating arm relative to the second casing, so as to guide the rotating arm to rotate relative to the second casing.

7. The lifting mechanism of claim 6, wherein the guiding post comprises a hook structure, and the lifting mechanism further comprises:
   a bushing member sheathing the guiding post, the bushing member abutting against the rotating arm as being hooked by the hook structure, so as to prevent the other end of the rotating arm from separating from the second casing.

8. The lifting mechanism of claim 1, wherein the rotating arm is a substantially fan-shaped structure.

9. The lifting mechanism of claim 1, wherein the lifting member comprises a first fixing structure, and the lifting mechanism further comprises:
   a sliding member slidably disposed on the first casing;
   a second fixing structure protruding from a side of the sliding member, the second fixing structure sliding with the sliding member to a fixing position for abutting against the first fixing structure when the lifting member is expanded out of the first casing, so as to keep the lifting member to be out of the first casing; and
   a guiding structure formed on the second fixing structure, the guiding structure moving relative to the first fixing structure when the first fixing structure passes through the second fixing structure, so as to guide the sliding member to separate from the fixing position in a second direction opposite to the first direction.

10. The lifting mechanism of claim 9, further comprising:
    a pushing button slidably installed on the first casing and connected to the sliding member, the pushing button being for sliding the sliding member relative to the first casing in the first direction or in the second direction; and
    a recovering member connected to the first casing and the sliding member, the recovering member being for sliding the sliding member to the fixing position in the first direction.

11. The lifting mechanism of claim 1, further comprising:
    at least one transmission port disposed on a side of the lifting member, the at least one transmission port being exposed on the first casing when the lifting member is expanded out of the first casing, the at least one transmission port being contained inside the first casing when the lifting member is retracted inside the first casing.

12. An electronic device, comprising:
a first casing;
a second casing combined with the first casing; and
a lifting mechanism, comprising:
- a lifting member with a side pivoted to the first casing;
- a first magnetic member fixed on the lifting member;
- a rotating arm with an end pivoted to the second casing;
- a second magnetic member fixed on the rotating arm, the second magnetic member attracting the first magnetic member as being rotated with the rotating arm to where the second magnetic member is aligned with the first magnetic member, so as to retract the lifting member inside the first casing; and
- at least one resilient member resiliently abutting against the second casing and the lifting member, the at least one resilient member pushing the lifting member as being rotated with the rotating arm to where the second magnetic member is not aligned with the first magnetic member, so as to rotate the lifting member to be expanded out of the first casing, wherein a magnetic force generated by the second magnetic member and the first magnetic member when the second magnetic member is aligned with the first magnetic member is greater than a resilient force generated by the at least one resilient member when the second magnetic member is not aligned with the first magnetic member.

13. The electronic device of claim 12, wherein the lifting mechanism further comprises:
- a rotating button rotably installed on the second casing and connected to the end of the rotating arm, the rotating button being for rotating the rotating arm relative to the second casing.

14. The electronic device of claim 13, wherein the rotating button comprises:
- a button body exposed on the second casing; and
- a transmission post protruding from the button body and being disposed through the second casing and the end of the rotating arm, the transmission post being for transmitting a torque exerted on the button body from the button body to the rotating arm.

15. The electronic device of claim 14, wherein a through hole is formed on the end of the rotating arm, the rotating button further comprises a hook portion connected to the transmission post, the lifting mechanism further comprises a transmission member, and the transmission member comprises:
- a transmission bearing portion disposed inside the through hole on the rotating arm and sheathing the transmission post, the transmission bearing portion being for transmitting the torque from the transmission post to the rotating arm, so as to rotate the rotating arm relative to the second casing; and
- an engaging portion connected to the transmission bearing portion, the engaging portion abutting against the rotating arm as being hooked by the hook portion, so as to prevent the end of the rotating arm from separating from the second casing.

16. The electronic device of claim 13, wherein a guiding slot is formed on the other end of the rotating arm, and the lifting mechanism further comprises:
- a guiding post disposed on the second casing and installed inside the guiding slot, the guiding post sliding along the guiding slot when the rotating button rotates the rotating arm relative to the second casing, so as to guide the rotating arm to rotate relative to the second casing.

17. The electronic device of claim 16, wherein the guiding post comprises a hook structure, and the lifting mechanism further comprises:
- a bushing member sheathing the guiding post, the bushing member abutting against the rotating arm as being hooked by the hook structure, so as to prevent the other end of the rotating arm from separating from the second casing.

18. The electronic device of claim 12, wherein the lifting member comprises a first fixing structure, and the lifting mechanism further comprises:
- a sliding member slidably disposed on the first casing;
- a second fixing structure protruding from a side of the sliding member, the second fixing structure sliding with the sliding member to a fixing position for abutting against the first fixing structure when the lifting member is expanded out of the first casing, so as to keep the lifting member to be out of the first casing; and
- a guiding structure formed on the second fixing structure, the guiding structure moving relative to the first fixing structure when the first fixing structure passes through the second fixing structure, so as to guide the sliding member to separate from the fixing position in a second direction opposite to the first direction.

19. The electronic device of claim 18, wherein the lifting mechanism further comprises:
- a pushing button slidably installed on the first casing and connected to the sliding member, the pushing button being for sliding the sliding member relative to the first casing in the first direction or in the second direction; and
- a recovering member connected to the first casing and the sliding member, the recovering member being for sliding the sliding member to the fixing position in the first direction.

20. The electronic device of claim 12, wherein the lifting mechanism further comprises:
- at least one transmission port disposed on a side of the lifting member, the at least one transmission port being exposed on the first casing when the lifting member is expanded out of the first casing, the at least one transmission port being contained inside the first casing when the lifting member is retracted inside the first casing.

* * * * *